United States Patent
Lee et al.

(10) Patent No.: US 8,374,244 B2
(45) Date of Patent: Feb. 12, 2013

(54) MOTION COMPENSATION METHOD AND APPARATUS THAT SEQUENTIALLY USE GLOBAL MOTION COMPENSATION AND LOCAL MOTION COMPENSATION, DECODING METHOD, VIDEO ENCODER, AND VIDEO DECODER

(75) Inventors: Tammy Lee, Seoul (KR); Woo-jin Han, Suwon-si (KR); Mathew Manu, Suwon-si (KR); Kyo-hyuk Lee, Yongin-si (KR); Sang-rae Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1388 days.

(21) Appl. No.: 11/748,537

(22) Filed: May 15, 2007

(65) Prior Publication Data

US 2008/0159393 A1 Jul. 3, 2008

(30) Foreign Application Priority Data

Jan. 3, 2007 (KR) .................. 10-2007-0000709

(51) Int. Cl.
*H04N 11/02* (2006.01)

(52) U.S. Cl. .................................. 375/240.14

(58) Field of Classification Search .............. 375/E7.148, 375/E7.17, E7.176, E7.224, E7.1, E7.256, 375/240.24
See application file for complete search history.

(56) References Cited

U.S. PATENT DOCUMENTS

| | | |
|---|---|---|
| 6,205,178 B1 | 3/2001 | Suzuki et al. |
| 6,785,331 B1 | 8/2004 | Jozawa et al. |
| 7,010,040 B2 | 3/2006 | Kim |
| 2002/0034251 A1* | 3/2002 | Suzuki ............. 375/240.16 |
| 2006/0114997 A1* | 6/2006 | Lelescu et al. ......... 375/240.16 |

FOREIGN PATENT DOCUMENTS

| | | |
|---|---|---|
| KR | 10-2004-0062660 A | 7/2004 |
| KR | 10-2006-0083803 A | 7/2006 |

* cited by examiner

*Primary Examiner* — Gilberto Barron, Jr.
*Assistant Examiner* — Simon Kanaan
(74) *Attorney, Agent, or Firm* — Sughrue Mion, PLLC

(57) ABSTRACT

A motion compensation method and apparatus that sequentially use global motion compensation and local motion compensation, a video decoding method, a video encoder, and a video decoder are provided. The motion compensation method includes extracting global motion information of a reference block, performing global motion compensation by applying the extracted global motion information to the reference block, extracting local motion information of the global motion-compensated reference block, and performing local motion compensation by applying the local motion information to the global motion-compensated reference block.

24 Claims, 5 Drawing Sheets

REFERENCE FRAME

CURRENT FRAME

MOTION COMPENSATION METHOD AND APPARATUS THAT SEQUENTIALLY USE GLOBAL MOTION COMPENSATION AND LOCAL MOTION COMPENSATION, DECODING METHOD, VIDEO ENCODER, AND VIDEO DECODER

CROSS-REFERENCE TO RELATED PATENT APPLICATIONS

This application claims priority from Korean Patent Application No. 10-2007-0000709, filed on Jan. 3, 2007, in the Korean Intellectual Property Office, the disclosure of which is incorporated herein in its entirety by reference.

BACKGROUND OF THE INVENTION

1. Field of the Invention

Methods and apparatuses consistent with the present invention generally relate to video coding and decoding, and more particularly, to motion compensation sequentially using global motion compensation and local motion compensation for video coding and decoding.

2. Description of the Related Art

Motion estimation and compensation play an important role in video data compression and use high temporal redundancy between consecutive frames in a video sequence for high compression efficiency. A motion in a video sequence is caused by movement of an object or panning, zooming, or rotation of a camera. Generally, a motion caused by movement of an object is called a local motion and a motion caused by panning, zooming, or rotation of a camera is called a global motion. Most objects have complicated motions, i.e., a global motion and a local motion, and the local motion may be very little. Therefore, it is necessary to perform motion compensation separately for the global motion and the local motion.

SUMMARY OF THE INVENTION

The present invention provides a motion compensation method and apparatus that sequentially use global motion compensation and local motion compensation, a video decoding method, a video encoder, and a video decoder.

According to one aspect of the present invention, there is provided a motion compensation method including: extracting global motion information of a reference block; performing global motion compensation by applying the extracted global motion information to the reference block; extracting local motion information of the global motion-compensated reference block; and performing local motion compensation by applying the local motion information to the global motion-compensated reference block.

According to another aspect of the present invention, there is provided a computer-readable recording medium having recorded thereon a program for implementing the motion compensation method.

According to another aspect of the present invention, there is provided a motion compensation apparatus including: a global motion estimation unit which extracts global motion information of a reference block; a global motion compensation unit which performs global motion compensation by applying the extracted global motion information to the reference block; a local motion estimation unit which extracts local motion information of the global motion-compensated reference block; and a local motion compensation unit which performs local motion compensation by applying the local motion information to the global motion-compensated reference block.

According to another aspect of the present invention, there is provided a video encoder including: a motion compensation apparatus which extracts motion information of a reference block and generates a motion-compensated reference block by sequentially applying global motion compensation and local motion compensation to the reference block; an addition unit which subtracts the motion-compensated reference block from a current block, thereby generating a residual block; a frequency transformation unit which transforms spatial-domain coefficients of the residual block output from the addition unit into frequency-domain coefficients; a quantization unit which quantizes the transformed frequency-domain coefficients of the residual block, and an entropy-coding unit which entropy-codes the quantized frequency-domain coefficients of the residual block.

According to another aspect of the present invention, there is provided a video decoder including: an entropy-decoding unit which entropy-decodes global motion information, local motion information, and a residual block from an encoded bitstream; an inverse quantization unit which inversely quantizes the entropy-decoded frequency-domain coefficients of the residual block; an inverse frequency transformation unit which inversely transforms the inversely quantized frequency-domain coefficients of the residual block into spatial-domain coefficients; a global motion compensation unit which performs global motion compensation by applying the entropy-decoded global motion information to a reference block; a local motion compensation unit which performs local motion compensation by applying the entropy-decoded local motion information to the global motion-compensated reference block; and an addition unit which adds the residual block having the inversely transformed spatial-domain coefficients to the local motion-compensated reference block, thereby generating a current block.

According to another aspect of the present invention, there is provided a video decoding method including: entropy-decoding global motion information, local motion information, and a residual block from an encoded bitstream; inversely quantizing the entropy-decoded frequency-domain coefficients of the residual block; inversely transforming the inversely quantized frequency-domain coefficients of the residual block into spatial-domain coefficients; performing global motion compensation by applying the entropy-decoded global motion information to a reference block, performing local motion compensation by applying the entropy-decoded local motion information to the global motion-compensated reference block, and adding the residual block having the inversely transformed spatial-domain coefficients to the local motion-compensated reference block, thereby generating a current block.

According to another aspect of the present invention, there is provided a computer-readable recording medium having recorded thereon a program for implementing the video decoding method.

The global motion information may comprise at least one parameter of one of an Affine model, a Translation model, a Perspective model, and a Projective model.

The local motion information may comprise at least one parameter of one of an Affine model, a Translation model, a Perspective model, and a Projective model, or comprises a local motion vector using a block matching algorithm.

BRIEF DESCRIPTION OF THE DRAWINGS

The above and other aspects of the present invention will become more apparent by describing in detail an exemplary embodiment thereof with reference to the attached drawings, in which.

DETAILED DESCRIPTION OF EXEMPLARY EMBODIMENTS

Figure 1:
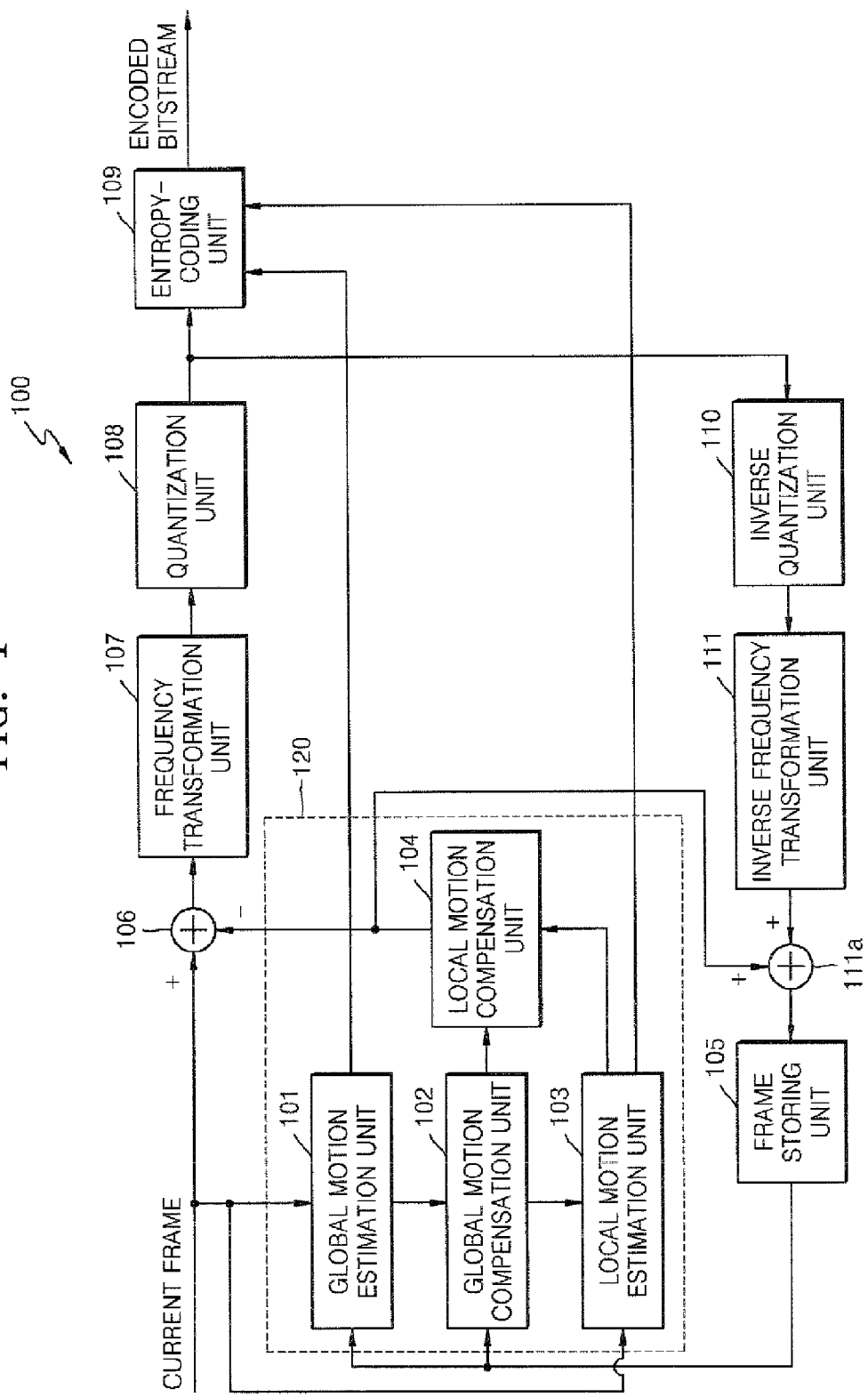
FIG. 1 is a block diagram of a video encoder including a motion compensation apparatus according to an exemplary embodiment of the present invention.

Hereinafter, an exemplary embodiment of the present invention will be described in detail with reference to the accompanying drawings. It should be noticed that like reference numerals refer to like elements illustrated in one or more of the drawings. It would be obvious to those skilled in the art that many specifics like elements of a circuit are provided only to facilitate understanding of the present invention and the present invention can be implemented without those specifics. In the following description of the present invention, a detailed description of known functions and configurations incorporated herein will be omitted for conciseness and clarity.

Figure 2A:
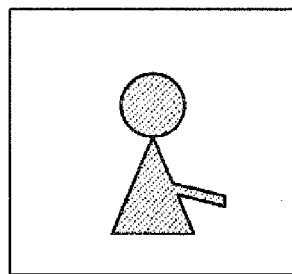
FIGS. 2A through 2D are views for explaining global motion compensation and local motion compensation according to an exemplary embodiment of the present invention.
Figure 2B:
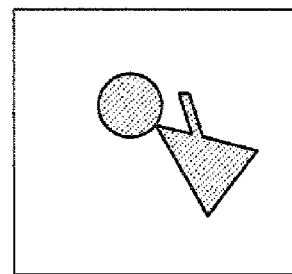
Figure 2C:
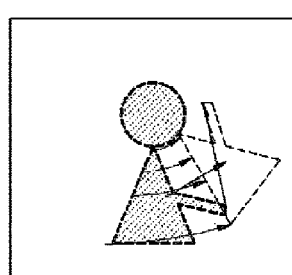
Figure 2D:
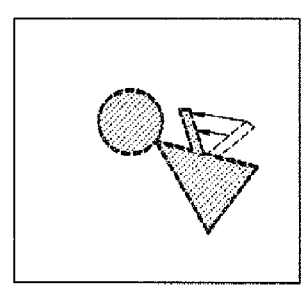
Figure 3A:
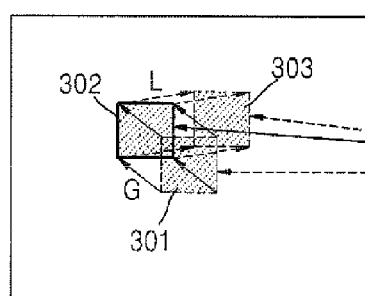
FIGS. 3A and 3B illustrate a global motion vector and a local motion vector according to an exemplary embodiment of the present invention.
Figure 3B:
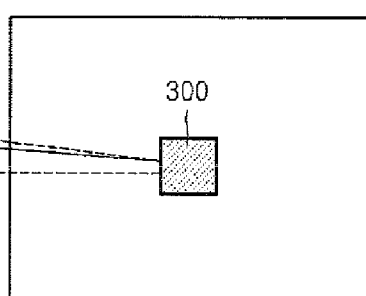

FIG. 1 is a block diagram of a video encoder 100 according to an exemplary embodiment of the present invention, FIGS. 2A through 2D are views for explaining global motion compensation and local motion compensation according to an exemplary embodiment of the present invention, and FIGS. 3A and 3B illustrate a global motion vector G and a local motion vector L. In FIG. 1, a motion compensation apparatus 120 includes a global motion estimation unit 101, a global motion compensation unit 102, a local motion estimation unit 103, and a local motion compensation unit 104.

Referring to FIG. 1, the global motion estimation unit 101 extracts global motion information from a reference frame, i.e., a previous frame, stored in a frame storing unit 105, and a current frame. The extracted global motion information is output to the global motion compensation unit 102 and an entropy-coding unit 109. In the present invention, a global motion is caused by movement of a camera, i.e., panning, zooming, or rotation of the camera, and is interpreted as including an object-based motion in a broad sense.

To extract the global motion information, various motion models may be selected and used. For example, one of a Translation model, an Affine model, and a Projective model may be used. Two parameters may be used as global motion information in the translation model, six parameters may be used as global motion information in the Affine model, and eight parameters may be used as global motion information in the Projective model. However, those motion models are only examples and other various motion models may be used to generate global motion information, as will be obvious to those skilled in the art.

The global motion compensation unit 102 performs global motion compensation on a reference block of a reference frame stored in the frame storing unit 105 using the global motion information received from the global motion estimation unit 101. In other words, a global motion vector is generated using global motion parameters and global motion compensation is performed pixel-by-pixel. The global motion-compensated reference block is delivered to the local motion compensation unit 104.

FIGS. 2A and 2D are views for explaining global motion compensation and local motion compensation according to an exemplary embodiment of the present invention. More specifically, an object of a reference frame before motion compensation is illustrated in FIG. 2A, an object of the current frame is illustrated in FIG. 2B, a dashed portion indicated by a bold-dotted line indicates an object before motion compensation and a portion indicated by a fine-dotted line indicates an object after global motion compensation and local motion compensation in FIG. 2C, and a dashed portion indicated by a bold-dotted line indicates an object after global motion compensation and local motion compensation and a portion indicated by a fine-dotted line indicates an object after global motion compensation in FIG. 2D. However, FIGS. 2A through 2D illustrate only examples for facilitating understanding of the present invention and it is obvious to those skilled in the art that global and local motions of an object are more complicated than shown in FIGS. 2A through 2D.

Referring back to FIG. 1, the local motion estimation unit 103 extracts local motion information from the global motion-compensated reference block and the current block of the current frame. The extracted local motion information is output to the local motion compensation unit 104 and the entropy-coding unit 109. Similarly with global motion estimation, a variety of motion models such as the translation model, the Affine model, or the Projective model may be selected and used for local motion estimation and in this case, motion parameters according to each of the motion models may be used as the local motion information. The local motion information may also be obtained by a blocking matching algorithm and in this case, the local motion information is a motion vector.

FIGS. 3A and 3B illustrate a global motion vector G and a local motion vector L, in which a reference frame is illustrated in FIG. 3A and a current frame is illustrated in FIG. 3B. A reference numeral 300 indicates a current block of a current frame, a reference numeral 301 indicates a reference block of a reference frame, which is located in the spatially same position as the current block 300, a reference numeral 302 indicates a block for explaining the global motion vector G, and a reference numeral 303 indicates a block for explaining the local motion vector L. As illustrated in FIGS. 3A and 3B, motion compensation can be performed block-by-block or partition-by-partition. In particular, it should be noted that local motion compensation is performed based on a point in which global motion compensation is performed in relation to FIGS. 3A and 3B.

Referring back to FIG. 1, the local motion compensation unit 104 applies the local motion information received from the local motion estimation unit 103 to the global motion-compensated reference block received from the global motion compensation unit 102, thereby generating a local motion-compensated reference block. The generated local motion-compensated reference block is output to an addition unit 111a and an addition unit 106.

The addition unit 106 subtracts the reference block received from the local motion compensation unit 104 from the current block of the current frame, thereby generating a residual block.

The frame storing unit 105 stores a reference frame for motion estimation and compensation of the current block. The reference frame may temporally precede or follow the current frame.

A frequency transformation unit 107 transforms spatial-domain values of the residual block into frequency-domain values using a discrete cosine transformation (DCT) and outputs the residual block having the transformed frequency-domain values to a quantization unit 108.

The quantization unit 108 quantizes the residual block having the transformed frequency-domain values received from the frequency transformation unit 107 and outputs the quantized residual block to the entropy-coding unit 109.

The entropy-coding unit 109 performs entropy-coding on the quantized residual block, and the local motion information and the global motion information that are received from the motion compensation apparatus 120.

A data flow for reconstruction of a reference frame is as follows.

An inverse quantization unit 110 inversely quantizes the quantized residual block and outputs the inversely quantized residual block to an inverse frequency transformation unit 111.

The inverse frequency transformation unit 111 inversely transforms the frequency-domain values of the inversely quantized residual block into spatial-domain values and outputs the residual block having the inversely transformed spatial-domain values to the addition unit 111a.

The addition unit 111a adds the local motion-compensated reference block received from the local motion compensation unit 104 to the residual block having the spatial-domain values in order to generate a reference block, and the generated reference block is stored in the frame storing unit 105.

Figure 4:
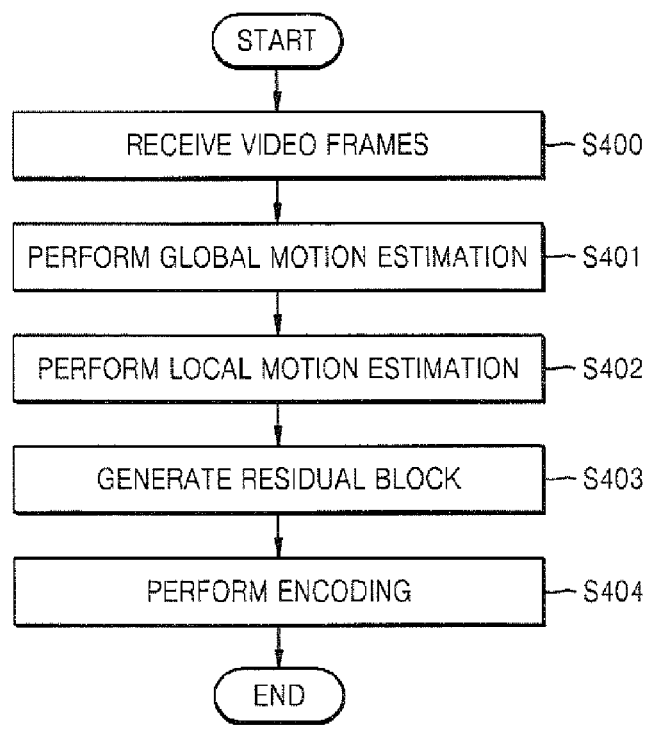
FIG. 4 is a flowchart of a video encoding method including a motion compensation process sequentially using global motion compensation and local motion compensation according to an exemplary embodiment of the present invention.

FIG. 4 is a flowchart of a video encoding method including a motion compensation process sequentially using global motion compensation and local motion compensation according to an exemplary embodiment of the present invention.

Referring to FIG. 4, video frames are received in operation S400.

In operation S401, through global motion estimation, global motion information is extracted from a current block of a current frame and a reference block from among the received video frames. Global motion compensation is performed by applying the global motion information to the reference block, thereby generating a global motion-compensated reference block.

In operation S402, local motion estimation is performed on the global motion-compensated reference block and the current block, thereby extracting local motion information. The local motion information is applied to the global motion-compensated reference block, thereby generating a local motion-compensated reference block.

In operation S403, the reference block is subtracted from the current block in order to generate a residual block. In operation S404, a DCT, quantization, and entropy-coding are sequentially performed on the residual block.

Figure 5:
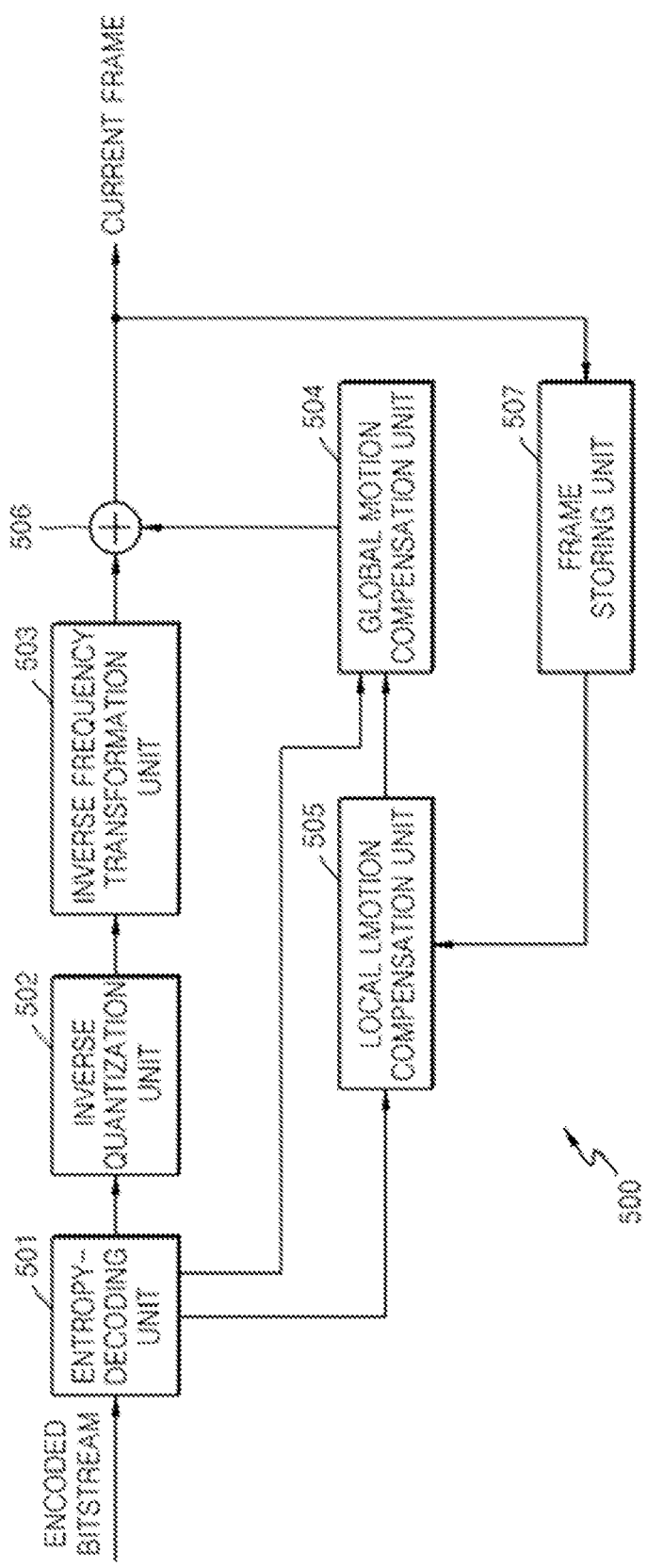
FIG. 5 is a block diagram of a video decoder according to an exemplary embodiment of the present invention.

FIG. 5 is a block diagram of a video decoder 500 according to an exemplary embodiment of the present invention. Referring to FIG. 5, the video decoder 500 includes an entropy-decoding unit 501, an inverse quantization unit 502, an inverse frequency transformation unit 503, a global motion compensation unit 504, a local motion compensation unit 505, an addition unit 506, and a frame storing unit 507.

The entropy-decoding unit 501 performs entropy-decoding on an encoded bitstream input from a video encoder and outputs the entropy-decoded bitstream to the inverse quantization unit 502. In particular, in the case of inter-mode coding, the entropy-decoding unit 501 performs entropy-decoding on global motion information, local motion information, and frequency-domain coefficients of a residual block. The entropy-decoded global motion information is output to the global motion compensation unit 504, the entropy-decoded local motion information is output to the local motion compensation unit 505, and the residual block including the entropy-decoded frequency-domain coefficients is output to the inverse quantization unit 502.

The inverse quantization unit 502 inversely quantizes the entropy-decoded frequency-domain coefficients of the residual block received from the entropy-decoding unit 501 and outputs the inversely quantized frequency-domain coefficients to the inverse frequency transformation unit 503.

The inverse frequency transformation unit 503 inversely transforms the inversely quantized frequency-domain coefficients of the residual block received from the inverse quantization unit 502 into spatial-domain coefficients and outputs the inversely transformed spatial-domain coefficients to the addition unit 506.

The addition unit 506 adds the local motion-compensated reference block received from the local motion compensation unit 504 to the residual block received from the inverse frequency transformation unit 503, thereby generating decoded data. The output of the addition unit 506 is decoded video data of the current frame.

More specifically, the global motion compensation unit 504 receives the decoded global motion information from the entropy-decoding unit 501 and performs global motion compensation by applying the received global motion information to the reference block received from the frame storing unit 507. The global motion-compensated reference block is output to the local motion compensation unit 505.

The local motion compensation unit 505 performs local motion compensation by applying the local motion information received from the entropy-decoding unit 501 to the global motion-compensated reference block received from the global motion compensation unit 504. The local motion-compensated reference block is output to the addition unit 506.

The frame storing unit 507 stores reference blocks referred to for the generation of the current block.

Figure 6:
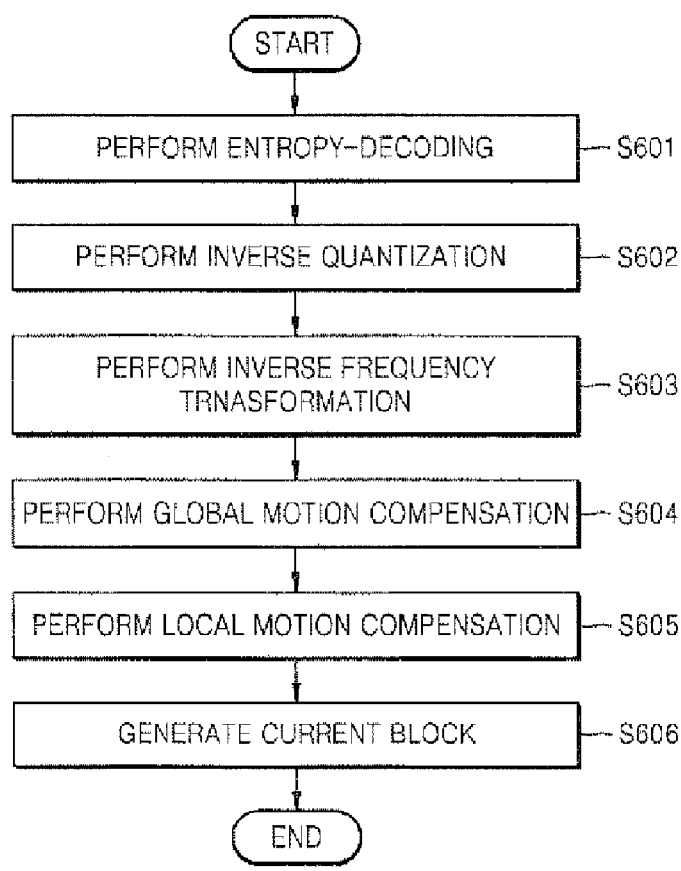
FIG. 6 is a flowchart of a video decoding method according to an exemplary embodiment of the present invention.

FIG. 6 is a flowchart of a video decoding method according to an exemplary embodiment of the present invention.

Referring to FIG. 6, global motion information, local motion information, and a residual block are entropy-decoded from a bitstream in operation S601.

In operation S602, frequency-domain coefficients of the entropy-decoded residual block are inversely quantized.

In operation S603, the inversely quantized frequency-domain coefficients of the residual block are transformed into spatial-domain coefficients.

In operation S604, global motion compensation is performed by applying the entropy-decoded local motion information to the reference block.

In operation S605, local motion compensation is performed by applying the entropy-decoded local motion information to the global motion-compensated reference block.

In operation S606, the local motion-compensated reference block is added to the residual block having the transformed spatial-domain coefficients, thereby generating a current block.

The global motion information or the local motion information may be parameters of one of an Affine model, a Translation model, a Perspective model and a Projective model. The local motion information is a local motion vector using a block matching algorithm.

As described above, according to the exemplary embodiments of the present invention, the amount of information transmitted to a video decoder can be reduced by sequentially using global motion compensation and local motion compensation.

Meanwhile, the exemplary embodiments of the present invention can also be embodied as computer-readable code on a computer-readable recording medium. The computer-readable recording medium is any data storage device that can store data which can be thereafter read by a computer system. Examples of computer-readable recording media include read-only memory (ROM), random-access memory (RAM), CD-ROMs, magnetic tapes, floppy disks, and optical data storage devices. The computer-readable recording medium can also be distributed over a network of coupled computer systems so that the computer-readable code is stored and executed in a decentralized fashion.

While the present invention has been particularly shown and described with reference to exemplary embodiments thereof, it will be understood by those of ordinary skill in the art that various changes in form and detail may be made therein without departing from the spirit and scope of the present invention as defined by the following claims.

What is claimed is:

1. A motion compensation method comprising:
   extracting global motion information of a reference block;
   performing global motion compensation by applying the extracted global motion information to the reference block;
   extracting local motion information of the global motion-compensated reference block; and
   performing local motion compensation by applying the local motion information to the global motion-compensated reference block,
   wherein the local motion compensation is performed based on a point in which global motion compensation is performed.

2. The motion compensation method of claim 1, wherein the global motion information comprises at least one parameter of one of an Affine model, a Translation model, a Perspective model, and a Projective model.

3. The motion compensation method of claim 1, wherein the local motion information comprises at least one parameter of one of an Affine model, a Translation model, a Perspective model, and a Projective model.

4. The motion compensation method of claim 1, wherein the local motion information comprises a local motion vector using a block matching algorithm.

5. The motion compensation method of claim 1, further comprising transmitting the global motion information and the local motion information.

6. A non-transitory computer-readable recording medium having recorded thereon a program for implementing the motion compensation method of one of claim 1.

7. A motion compensation apparatus comprising:
   a global motion estimation unit, implemented by a processor, which extracts global motion information of a reference block from a reference frame and a current frame;
   a global motion compensation unit, implemented by a processor, which performs global motion compensation by applying the extracted global motion information to the reference block;
   a local motion estimation unit, implemented by a processor, which extracts local motion information of the global motion-compensated reference block from the global motion-compensated reference block and a current clock of the current frame; and
   a local motion compensation unit, implemented by a processor, which performs local motion compensation by applying the local motion information to the global motion-compensated reference block,
   wherein the local motion compensation is performed based on a point in which the global motion compensation is performed.

8. The motion compensation apparatus of claim 7, wherein the global motion information comprises at least one parameter of one of an Affine model, a Translation model, a Perspective model, and a Projective model.

9. The motion compensation apparatus of claim 7, wherein the local motion information comprises at least one parameter of one of an Affine model, a Translation model, a Perspective model, and a Projective model.

10. The motion compensation apparatus of claim 7, wherein the local motion information comprises a local motion vector using a block matching algorithm.

11. A video encoder comprising:
    a motion compensation apparatus which extracts motion information of a reference block from a reference frame and a current frame and generates a motion-compensated reference block by sequentially applying global motion compensation and local motion compensation to the reference block;
    an addition unit, implemented by a processor, which subtracts the motion-compensated reference block from a current block of the current frame, thereby generating a residual block;
    a frequency transformation unit, implemented by a processor, which transforms spatial-domain coefficients of the residual block output from the addition unit into frequency-domain coefficients;
    a quantization unit, implemented by a processor, which quantizes the transformed frequency-domain coefficients of the residual block; and
    an entropy-coding unit, implemented by a processor, which entropy-codes the quantized frequency-domain coefficients of the residual block,
    wherein the local motion compensation is performed based on a point in which the global motion compensation is performed.

12. The video encoder of claim 11, wherein the motion compensation apparatus further comprises:
    a global motion estimation unit which extracts global motion information of the reference block;
    a global motion compensation unit which performs global motion compensation by applying the extracted global motion information to the reference block;
    a local motion estimation unit which extracts local motion information of the global motion-compensated reference block; and
    a local motion compensation unit which performs local motion compensation by applying the local motion information to the global motion-compensated reference block.

13. The video encoder of claim 12, wherein the global motion information comprises at least one parameter of one of an Affine model, a Translation model, a Perspective model, and a Projective model.

14. The video encoder of claim 12, wherein the local motion information comprises at least one parameter of one of an Affine model, a Translation model, a Perspective model, and a Projective model.

15. The video encoder of claim 12, wherein the local motion information comprises a local motion vector using a block matching algorithm.

16. A video decoder comprising:
   an entropy-decoding unit, implemented by a processor, which entropy-decodes global motion information, local motion information, and a residual block from an encoded bitstream;
   an inverse quantization unit, implemented by a processor, which inversely quantizes the entropy-decoded frequency-domain coefficients of the residual block;
   an inverse frequency transformation unit, implemented by a processor, which inversely transforms the inversely quantized frequency-domain coefficients of the residual block into spatial-domain coefficients;
   a global motion compensation unit, implemented by a processor, which performs global motion compensation by applying the entropy-decoded global motion information to a reference block of a reference frame;
   a local motion compensation unit, implemented by a processor, which performs local motion compensation by applying the entropy-decoded local motion information to the global motion-compensated reference block; and
   an addition unit, implemented by a processor, which adds the residual block having the inversely transformed spatial-domain coefficients to the local motion-compensated reference block, thereby generating a current block,
   wherein the local motion compensation is performed based on a point in which the global motion compensation is performed.

17. The video decoder of claim 16, wherein the global motion information comprises at least one parameter of one of an Affine model, a Translation model, a Perspective model, and a Projective model.

18. The video decoder of claim 16, wherein the local motion information comprises at least one parameter of one of an Affine model, a Translation model, a Perspective model, and a Projective model.

19. The video decoder of claim 16, wherein the local motion information comprises a local motion vector using a block matching algorithm.

20. A video decoding method comprising:
   entropy-decoding global motion information, local motion information, and a residual block from an encoded bitstream;
   inversely quantizing the entropy-decoded frequency-domain coefficients of the residual block;
   inversely transforming the inversely quantized frequency-domain coefficients of the residual block into spatial-domain coefficients;
   performing global motion compensation by applying the entropy-decoded global motion information to a reference block;
   performing local motion compensation by applying the entropy-decoded local motion information to the global motion-compensated reference block; and
   adding the residual block having the inversely transformed spatial-domain coefficients to the local motion-compensated reference block, thereby generating a current block,
   wherein the local motion compensation is performed based on a point in which the global motion compensation is performed.

21. The video decoding method of claim 20, wherein the global motion information comprises at least one parameter of one of an Affine model, a Translation model, a Perspective model, and a Projective model.

22. The video decoding method of claim 20, wherein the local motion information comprises at least one parameter of one of an Affine model, a Translation model, a Perspective model, and a Projective model.

23. The video decoding method of claim 20, wherein the local motion information comprises a local motion vector using a block matching algorithm.

24. A non-transitory computer-readable recording medium having recorded thereon a program for implementing the video decoding method of one of claim 20.

* * * * *